US006666049B1

(12) United States Patent
Katende et al.

(10) Patent No.: US 6,666,049 B1
(45) Date of Patent: Dec. 23, 2003

(54) METHOD FOR OPERATING A CRYOGENIC PLANT

(75) Inventors: Edward Katende, Lockport, NY (US); Amit Gupta, Deer Park, TX (US); Paul F. Scharf, North Tonawanda, NY (US)

(73) Assignee: Praxair Technology, Inc., Danbury, CT (US)

( * ) Notice: Subject to any disclaimer, the term of this patent is extended or adjusted under 35 U.S.C. 154(b) by 0 days.

(21) Appl. No.: 10/391,557

(22) Filed: Mar. 20, 2003

(51) Int. Cl.[7] ................................................. F25J 3/04
(52) U.S. Cl. ....................................................... 62/656
(58) Field of Search .......................... 62/617, 640, 643, 62/656, 657

(56) References Cited

U.S. PATENT DOCUMENTS

| | | | |
|---|---|---|---|
| 5,099,436 A | * | 3/1992 | McCown et al. ............ 364/550 |
| 5,252,060 A | * | 10/1993 | McKinnon et al. ............ 431/12 |
| 5,257,206 A | | 10/1993 | Hanson ....................... 364/502 |
| 5,265,031 A | * | 11/1993 | Malczewski ................. 364/497 |
| 5,315,521 A | | 5/1994 | Hanson et al. ............... 364/468 |
| 5,557,549 A | * | 9/1996 | Chang .................... 364/551.01 |
| 6,173,564 B1 | | 1/2001 | Zachary .................... 60/39.091 |
| 6,253,577 B1 | | 7/2001 | Arman et al. .................. 62/646 |

* cited by examiner

*Primary Examiner*—Sang Y. Paik
*Assistant Examiner*—Malik N. Drake
(74) *Attorney, Agent, or Firm*—Stanley Ktorides

(57) ABSTRACT

A method for operating a cryogenic plant using an online real-time monitoring and diagnostic system that continually compares actual versus expected plant key performance indicators, alerts operating personnel to any significant performance shortfall, assists in required diagnostics, and suggests corrective actions, preferably using a top-down diagnostic tree methodology that presents calculated key performance indicators to the operator in a manner which logically flows from plant overview to detailed breakdown by plant area and equipment component.

10 Claims, 4 Drawing Sheets

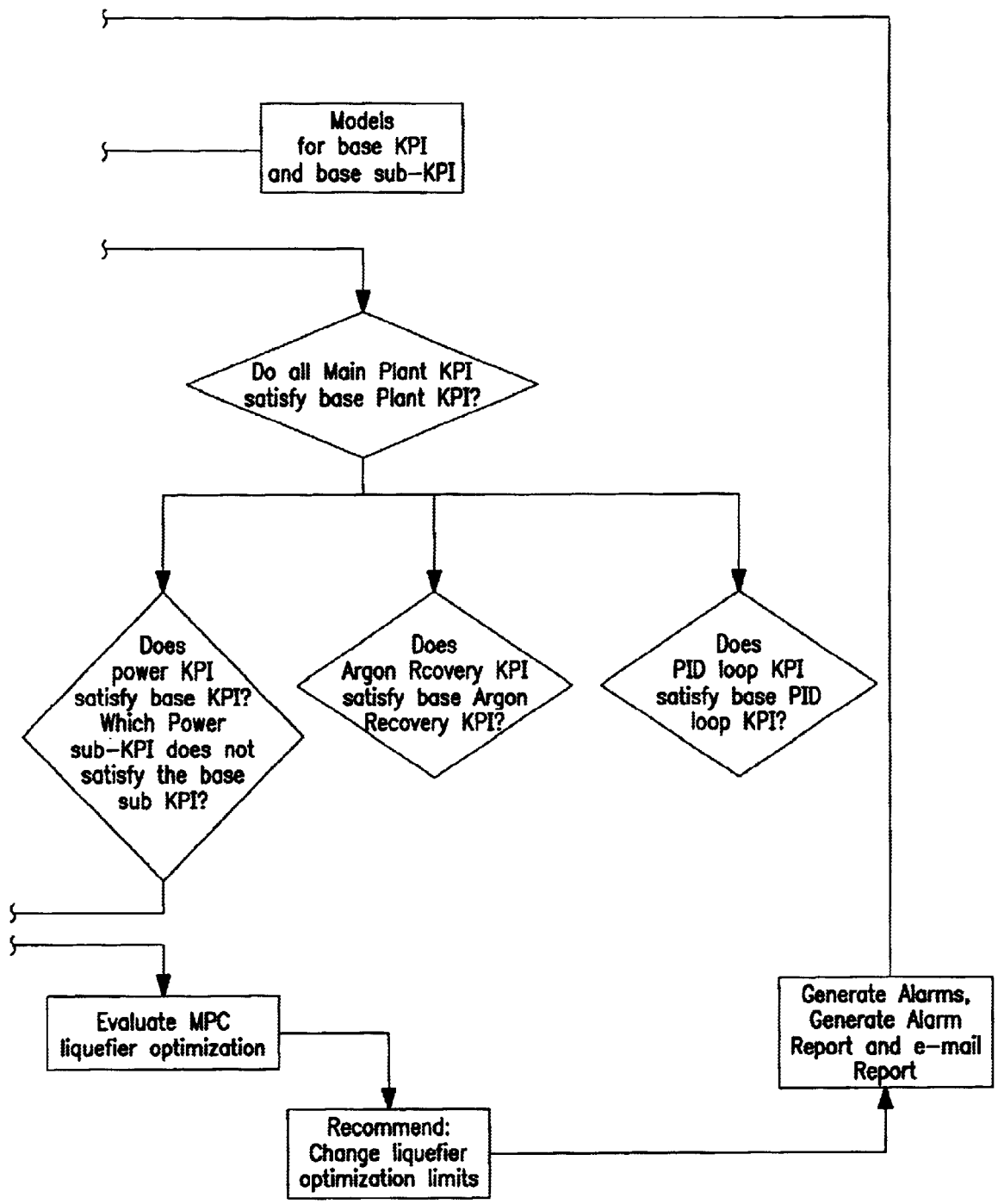
FIG. 3 Cont.'d

METHOD FOR OPERATING A CRYOGENIC PLANT

TECHNICAL FIELD

This invention relates generally to the operation of a cryogenic plant such as a cryogenic air separation plant.

BACKGROUND ART

Cryogenic plants such as cryogenic rectification plants frequently experience problems such as the operating power is too high or not optimal and there is no way to indicate in real-time/online that a problem has occurred and caused the plant to operate in a non-optimal fashion or to determine a solution in real-time/online. Moreover, scheduled shutdowns may occur more frequently than desired and little can be done to identify inefficiencies in time to avoid unscheduled shutdown. Furthermore, non-optimal product flows, recoveries or purity caused by instrumentation or primary control or advanced control failure or anomaly may occur and there is no way of determining whether product flows, recoveries or targeted purities are actually optimal or not, and it is difficult to determine the cause of deviation.

Accordingly, it is an object of this invention to provide a method for operating a cryogenic plant, such as a cryogenic air separation plant which will enable online real time monitoring of the plant and provide online real time diagnosis of problems along with suggested corrective actions to quickly address and correct such problem.

SUMMARY OF THE INVENTION

The above and other objects, which will become apparent to those skilled in the art upon a reading of this disclosure, are attained by the present invention which is:

A method for operating a cryogenic plant comprising:

(A) determining the expected optimal value range at a given time using a process model for at least one key performance indicator from the group consisting of plant power consumption, product recovery, PID loop performance, MPC steady state optimization, MPC model prediction and MPC dynamic performance;

(B) monitoring the value of each of the key performance indicators for which an expected optimal value range has been determined;

(C) alerting a plant operator when the value of a monitored key performance indicator is outside of the determined expected optimal value range for that key performance indicator; and (D) suggesting at least one action to the plant operator for adjusting the operation of the cryogenic plant so that the value of the monitored key performance indicator which is outside of the expected optimal value range for that key performance indicator is changed so that it is within the expected optimal value range for that key performance indicator.

As used herein the term "column" means a distillation or fractionation column or zone, i.e. a contacting column or zone, wherein liquid and vapor phases are countercurrently contacted to effect separation of a fluid mixture, as for example, by contacting of the vapor and liquid phases on a series of vertically spaced trays or plates mounted within the column and/or on packing elements such as structured or random packing. For a further discussion of distillation columns, see the Chemical Engineer's Handbook, fifth edition, edited by R. H. Perry and C. H. Chilton, McGraw-Hill Book Company, New York, Section 13, *The Continuous Distillation Process*.

The term "double column" is used to mean a higher pressure column having its upper portion in heat exchange relation with the lower portion of a lower pressure column. A further discussion of double columns appears in Ruheman "The Separation of Gases", Oxford University Press, 1949, Chapter VII, Commercial Air Separation.

Vapor and liquid contacting separation processes depend on the difference in vapor pressures for the components. The high vapor pressure (or more volatile or low boiling) component will tend to concentrate in the vapor phase whereas the low vapor pressure (or less volatile or high boiling) component will tend to concentrate in the liquid phase. Distillation is the separation process whereby heating of a liquid mixture can be used to concentrate the more volatile component(s) in the vapor phase and thereby the less volatile component(s) in the liquid phase. Partial condensation is the separation process whereby cooling of a vapor mixture can be used to concentrate the more volatile components) in the vapor phase and thereby the less volatile component(s) in the liquid phase. Rectification, or continuous distillation, is the separation process that combines successive partial vaporizations and condensations as obtained by a countercurrent treatment of the vapor and liquid phases. The countercurrent contacting of the vapor and liquid phases can be adiabatic or nonadiabatic and can include integral (stagewise) or differential (continuous) contact between the phases. Separation process arrangements that utilize the principles of rectification to separate mixtures are often interchangeably termed rectification columns, distillation columns, or fractionation columns. Cryogenic rectification is a rectification process carried out at least in part at temperatures at or below 150 degrees Kelvin (K).

As used herein the term "indirect heat exchange" means the bringing of two fluid streams into heat exchange relation without any physical contact or intermixing of the fluids with each other.

As used herein the term "expansion" means to effect a reduction in pressure.

As used herein the term "product gaseous oxygen" means a gas having an oxygen concentration of at least 90 mole percent.

As used herein the term "feed air" means a mixture comprising primarily oxygen, nitrogen and argon, such as ambient air.

As used herein the terms "upper portion" and "lower portion" mean those sections of a column respectively above and below the mid point of the column.

As used herein the term "MPC" means model productive controller.

As used herein the term "PID" means proportional integral derivative controller.

As used herein the term "key performance indicator" means a calculated parameter used to determine the performance of a cryogenic plant or a model predictive controller.

As used herein the term "steady state optimization" means the ability of a model predictive controller to control a cryogenic plant and keep the controlled variables within a given range at steady state.

As used herein the term "load change" means the ability of a model predictive controller to control a cryogenic plant and keep the controlled variables within a given range when a load change is made.

As used herein the term "plant operator" means personnel responsible to monitor and operate a cryogenic plant.

As used herein the term "screen display" means a computer screen acting as a human-machine interface residing on a plant control system computer to display real-time on-line data.

As used herein the term "top-down diagnostic tree methodology" means a method used to determine plant and MPC performance problems by starting at a generalized composite key performance indicator, breaking it down into sub-key performance indicators, and arriving at a particular branch as the root cause of the problem.

DETAILED DESCRIPTION

The invention will be described in detail with reference to the Drawings. The operation of the cryogenic air separation plant illustrated in FIG. 1 will now be described.

Figure 1:
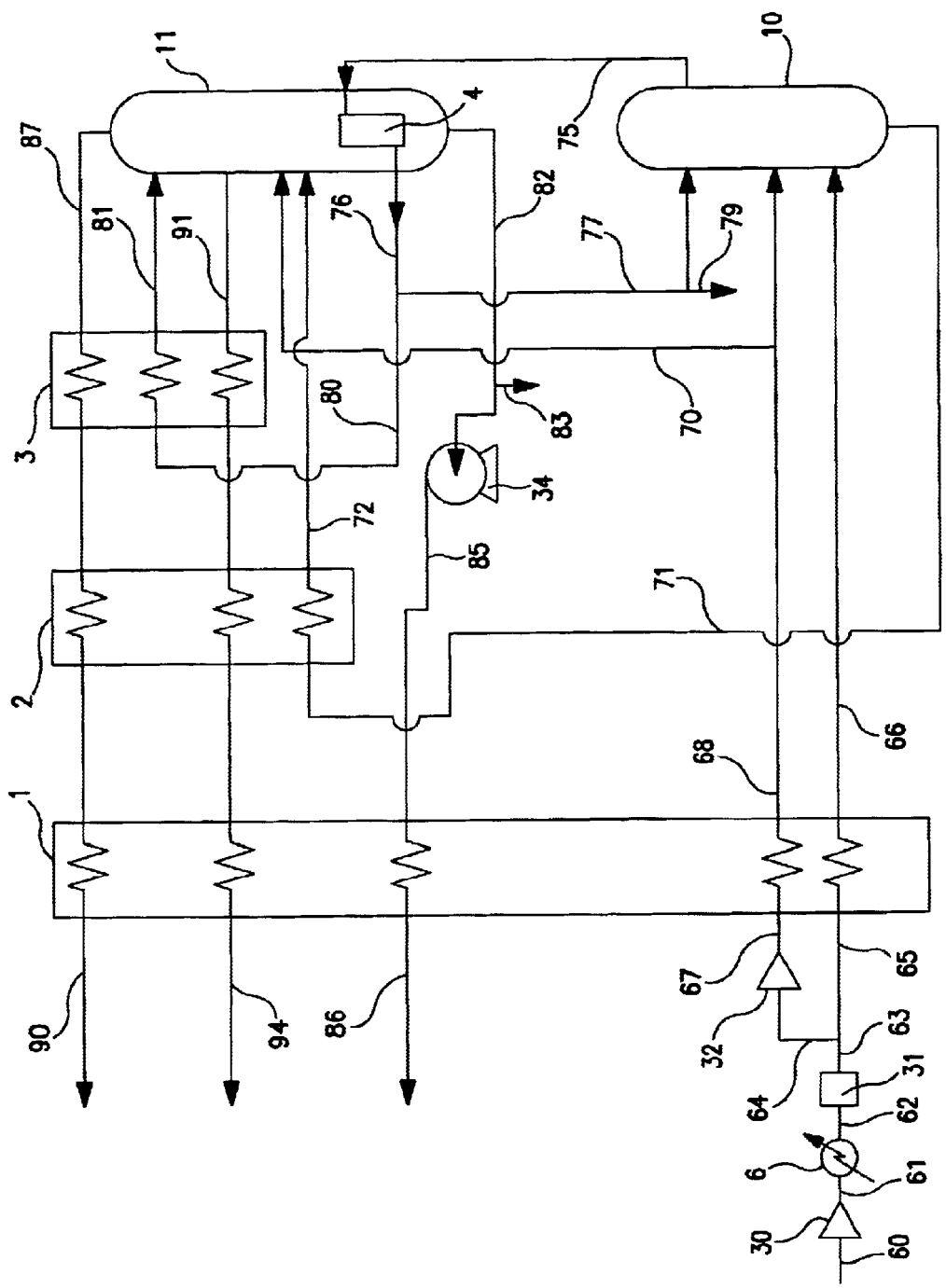
FIG. 1 is a schematic representation of one of the many cryogenic plants which can benefit by the use of the operating method of this invention. The cryogenic rectification plant illustrated in FIG. 1 is a cryogenic air separation plant.

Referring now to FIG. 1, feed air 60 is compressed by passage through base load compressor 30 to a pressure generally within the range of from 60 to 200 1 pounds per square inch absolute (psia). Resulting. compressed feed air 61 is cooled of the heat of compression in aftercooler 6 and resulting feed air stream 62 is then cleaned of high boiling impurities such as water vapor, carbon dioxide and hydrocarbons by passage through purifier 31. Purified feed air stream 63 is divided into streams 64 and 65. Stream 64 is increased in pressure by passage through booster compressor 32 to a pressure generally within the range of from 100 to 1000 psia to form boosted feed air stream 67. Feed air streams 65 and 67 are cooled by passage through main heat exchanger 1 by indirect heat exchange with return streams and then passed as streams 66 and 68 respectively into higher pressure column 10 which is operating at a pressure generally within the range of from 60 to 200 psia. A portion 70 of stream 68 may also be passed into lower pressure column 11.

Within higher pressure column 10 the feed air is separated by cryogenic rectification into nitrogen-enriched fluid and oxygen-enriched fluid. Nitrogen-enriched fluid is withdrawn as vapor from the upper portion of higher pressure column 10 in stream 75 and condensed in main condenser 4 by indirect heat exchange with boiling lower pressure column bottom liquid. Resulting nitrogen-enriched liquid 76 is returned to column 10 as reflux as shown by stream 77. A portion 80 of the nitrogen-enriched liquid 76 is passed from column 10 to subcooler 3 wherein it is subcooled to form subcooled stream 81 which is passed into the upper portion of column 11 as reflux. If desired, a portion 79 of stream 77 may be recovered as product liquid nitrogen. Also, if desired, a portion (not shown) of nitrogen-enriched vapor stream 75 may be recovered as product high pressure nitrogen gas.

Oxygen-enriched fluid is withdrawn as liquid from the lower portion of higher pressure column 10 in stream 71 and passed to subcooler 2 wherein it is subcooled. Resulting subcooled oxygen-enriched liquid 72 is then passed into lower pressure column 11.

Lower pressure column 11 is operating at a pressure less than that of higher pressure column 10 and generally within the range of from 15 to 150 psia. Within lower pressure column 11 the various feeds into that column are separated by cryogenic rectification into nitrogen-rich vapor and oxygen-rich liquid. Nitrogen-rich vapor is withdrawn from the upper portion of column 11 in stream 87, warmed by passage through heat exchangers 3, 2 and 1, and recovered as product gaseous nitrogen in stream 90 having a nitrogen concentration of at least 99 mole percent, preferably at least 99.9 mole percent, and most preferably at least 99.999 mole percent. For product purity control purposes a waste stream 91 is withdrawn from column 11 from a level below the withdrawal point of stream 87, warmed by passage through heat exchangers 3, 2 and 1, and removed from the system in stream 94.

Oxygen-rich liquid is withdrawn from the lower portion of lower pressure column 11 in stream 82. If desired, a portion 83 of stream 82 may be recovered as a product liquid oxygen having an oxygen concentration generally within the range of from 90 to 99.9 mole percent. Stream 82 is then passed to liquid pump 34 wherein it is pumped to an elevated pressure generally within the range of from 35 to 500 psia. Resulting elevated pressure oxygen-rich liquid 85 is vaporized and then recovered as elevated pressure gaseous oxygen product 86. In the embodiment of the invention illustrated in FIG. 1, the vaporization of the elevated pressure oxygen-rich liquid is shown as occurring within main heat exchanger 1. This vaporization can also occur within a separate heat exchanger such as a standalone product boiler. Refrigeration for the operation of the plant is generally provided by the turboexpansion of a process stream, e.g. a feed air stream. Such turboexpansion is not shown in the drawings.

Figure 2:
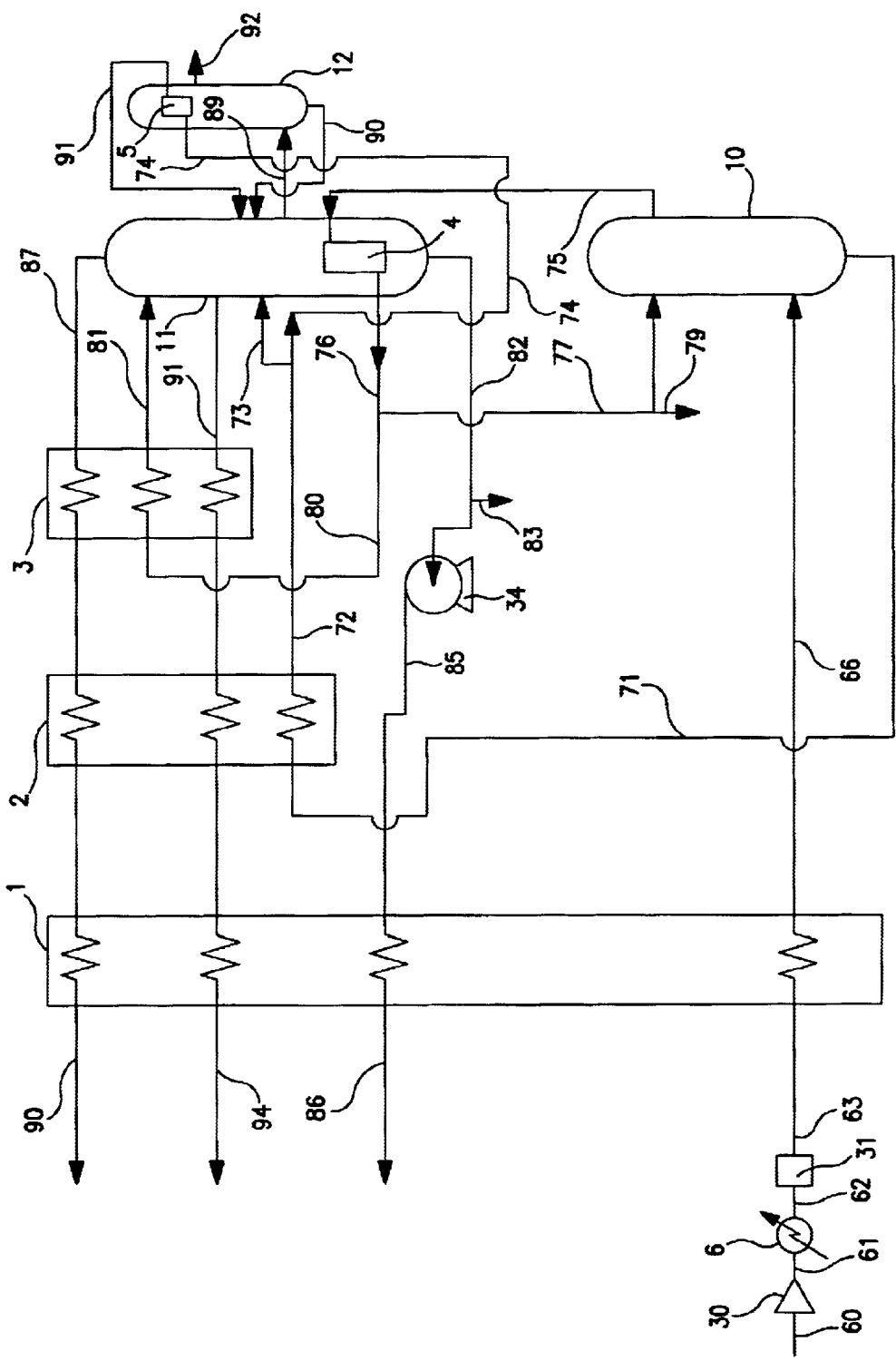
FIG. 2 is a schematic representation of another cryogenic air separation plant which can benefit by the use of the operating method of this invention.

FIG. 2 illustrates another cryogenic rectification plant for the practice of the invention. The numerals of FIG. 2 are the same as those of FIG. 1 for the common elements and these common elements will not be described again in detail In the embodiment illustrated in FIG. 2, feed air stream 63 is not divided but rather is passed directly through heat exchanger 1 and as stream 66 into higher pressure column 10. Subcooled oxygen-enriched liquid 72 is divided into portion 73 and portion 74. Portion 73 is passed into lower pressure column 11 and portion 74 is passed into argon column condenser 5 wherein it is at least partially vaporized. The resulting vapor is withdrawn from condenser 5 in stream 91 and passed into lower pressure column 11. Any remaining oxygen-enriched liquid is withdrawn from condenser 5 and then passed into lower pressure column 11.

Fluid comprising oxygen and argon is passed in stream 89 from lower pressure column 11 into argon column 12 wherein it is separated by cryogenic rectification into argon-richer fluid and oxygen-richer fluid oxygen-richer fluid is passed from the lower portion of column 12 in stream 90 into lower pressure column 11. Argon-richer fluid is passed from the upper portion of column 12 as vapor into argon column condenser 5 wherein it is condensed by indirect heat exchange with the aforesaid subcooled oxygen-enriched liquid. Resulting argon-richer liquid is withdrawn from condenser 5. A portion of the argon-richer liquid is passed into argon column 12 as reflux and another portion is recovered as product argon having an argon concentration generally within the range of from 95 to 99.9 mole percent as shown by stream 92.

The invention comprises a master process or calculation engine which performs online real-time monitoring of one or more key performance indicators of the plant, and a report generator/messaging system which provides alerts to the plant operator and also provides one or more suggested remedial or corrective actions to the plant operator. Preferably the alert provided to the plant operator is by a screen display. Most preferably the alert is also provided to other personnel by e-mail. Preferably the remedial action or actions suggested to the plant operator is by a screen display and most preferably a detailed report is e-mailed to other personnel.

The following describes one example of the practice of this invention wherein the cryogenic plant is a cryogenic air separation plant, wherein one product is oxygen, and the monitored key performance indicator is the optimum power required to produce a given amount of oxygen.

In the practice of this embodiment of the invention a mathematical process model is developed to determine, on-line, the optimum value range of power required to produce "x" amount of oxygen. This model is used to provide the expected or base power range. The actual power required to produce the amount of oxygen is determined and trail of these values is tracked for a certain period. The key performance indicator (KPI) is evaluated using mathematical algorithms and statistical methods, i.e. a mathematical process model, to determine whether power is within the expected range. Different options of operation are assessed and it is determined whether there is a significant shortfall between the actual and expected KPI. If there is a shortfall the root cause of the problem is identified. The different options may be: (1) low rotating equipment efficiency; if low efficiency, is it compressor efficiency or turbine efficiency; (2) product venting too high; if high product venting, which product; (3) compressor re-circulation valve is open; if valve is open, what is the reason.

The practice of the invention will finally reach a conclusion and recommend action to the operator. For example, if the problem is high product venting, the suggestions or recommendations could include:

decrease cold-box air flow target/upper limit;

decrease oxygen make flow target/upper limit;

decrease power target/upper limit; and or increase discharge pressure setpoint for the air compressor.

The practice of the invention alerts the operator of the problem and presents to the operator the recommended action in an easy to understand manner, preferably using a screen display, and also sends out e-mails to appropriate recipients with a detail report indicating the problem and its diagnostic information.

Figure 3:
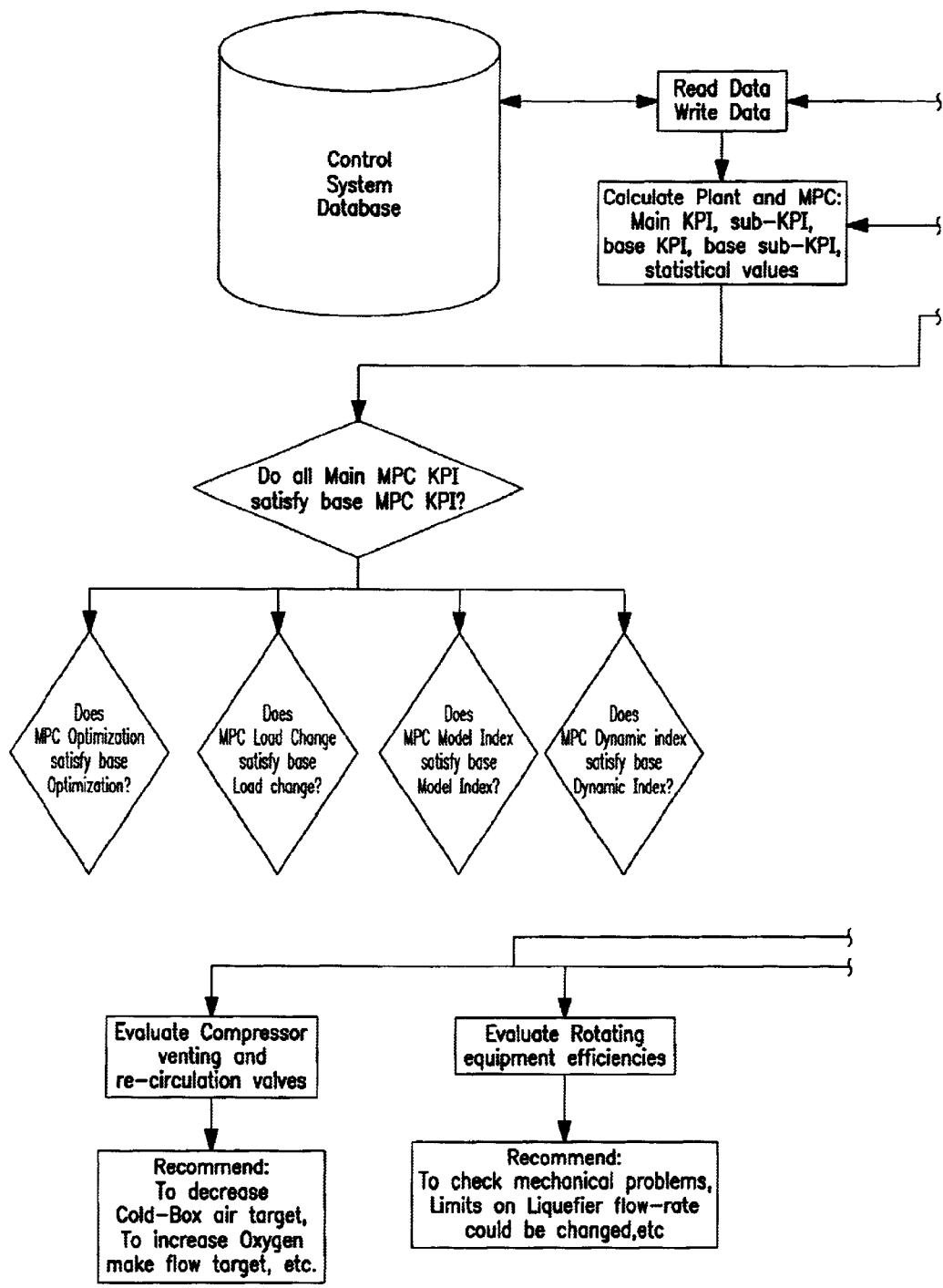
FIG. 3 is a flow chart illustrating one example of the top down diagnostic tree methodology useful in the practice of the invention.

In summary, the invention is an online real-time monitoring and diagnostic system that continuously compares actual versus expected plant performance. The system alerts operating personnel to any significant performance shortfall, assists in required diagnostics, and suggests corrective actions. A top-down diagnostic tree methodology is used that presents calculated key performance indicators (KPI) to the user in a manner which logically flows from plant overview to detailed break-down by plant area and equipment component, one example of which is illustrated in FIG. 3.

Although the invention has been described in detail with reference to certain preferred embodiments, those skilled in the art will recognize that there are other embodiments of the invention within the spirit and the scope of the claims. For example other plants which can employ the method of this invention include hydrogen-carbon monoxide plants, and carbon dioxide plants.

What is claimed is:

1. A method for operating a cryogenic plant comprising:

(A) determining the expected optimal value range at a given time using a process model for at least one key performance indicator from the group consisting of plant power consumption, product recovery, PID loop performance, MPC steady state optimization, MPC model prediction and MPC dynamic performance;

(B) monitoring the value of each of the key performance indicators for which an expected optimal value range has been determined;

(C) alerting a plant operator when the value of a monitored key performance indicator is outside of the determined expected optimal value range for that key performance indicator; and (D) suggesting at least one action to the plant operator for adjusting the operation of the cryogenic plant so that the value of the monitored key performance indicator which is outside of the expected optimal value range for that key performance indicator is changed so that it is within the expected optimal value range for that key performance indicator.

2. The method of claim 1 wherein the cryogenic rectification plant is a cryogenic air separation plant.

3. The method of claim 1 wherein the monitored key performance indicators comprises plant power consumption.

4. The method of claim 1 wherein the expected optimal value range is calculated using a mathematical process model.

5. The method of claim 1 wherein the alerting of the plant operator is by a screen display.

6. The method of claim 5 further comprising altering other personnel by e-mail.

7. The method of claim 1 wherein the suggesting of action to the plant operator is by a screen display.

8. The method of claim 7 further comprising sending a detailed report by e-mail to other personnel.

9. The method of claim 1 wherein the suggestion for action is determined using a top-down diagnostic tree methodology.

10. The method of claim 9 wherein the suggestion for action is indicated to the plant operator by a screen display.

* * * * *

UNITED STATES PATENT AND TRADEMARK OFFICE
CERTIFICATE OF CORRECTION

PATENT NO. : 6,666,049 B1
DATED : December 23, 2003
INVENTOR(S) : Katende et al.

It is certified that error appears in the above-identified patent and that said Letters Patent is hereby corrected as shown below:

Column 2,
Line 48, delete "productive" and insert therefor -- predictive --.

Column 6,
Line 43, delete "altering" and insert therefor -- alerting --.

Signed and Sealed this

Twenty-sixth Day of April, 2005

JON W. DUDAS
*Director of the United States Patent and Trademark Office*